United States Patent
Dadu et al.

(10) Patent No.: US 9,620,116 B2
(45) Date of Patent: Apr. 11, 2017

(54) PERFORMING AUTOMATED VOICE OPERATIONS BASED ON SENSOR DATA REFLECTING SOUND VIBRATION CONDITIONS AND MOTION CONDITIONS

(71) Applicant: Intel Corporation, Santa Clara, CA (US)

(72) Inventors: Saurabh Dadu, Tigard, OR (US); Lakshman Krishnamurthy, Portland, OR (US); Saurin Shah, Portland, OR (US); Francis M. Tharappel, Portland, OR (US); Swarnendu Kar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 14/140,293

(22) Filed: Dec. 24, 2013

(65) Prior Publication Data
US 2015/0179189 A1   Jun. 25, 2015

(51) Int. Cl.
| G10L 15/00 | (2013.01) |
| G10L 15/24 | (2013.01) |
| G10L 15/20 | (2006.01) |
| G10L 25/84 | (2013.01) |

(52) U.S. Cl.
CPC .............. *G10L 15/24* (2013.01); *G10L 15/20* (2013.01); *G10L 25/84* (2013.01)

(58) Field of Classification Search
CPC ....... G10L 15/265; G10L 15/22; G10L 15/30; G06F 3/16
USPC .................................................. 704/270, 275
See application file for complete search history.

(56) References Cited

U.S. PATENT DOCUMENTS

| 8,223,088 B1* | 7/2012 | Gomez et al. ..................... 345/7 |
| 2002/0143242 A1* | 10/2002 | Nemirovski .................. 600/300 |
| 2002/0194005 A1 | 12/2002 | Lahr |
| 2005/0114124 A1* | 5/2005 | Liu ...................... G10L 21/0208 704/228 |
| 2006/0079291 A1* | 4/2006 | Granovetter .......... G06F 17/289 455/563 |
| 2009/0129620 A1 | 5/2009 | Tagawa et al. |
| 2009/0149722 A1 | 6/2009 | Abolfathi et al. |
| 2009/0287485 A1* | 11/2009 | Glebe ................. G10L 21/0208 704/233 |

(Continued)

OTHER PUBLICATIONS

S. Tsuge, Daichi Koizumi, M. Fukumi and S. Kuroiwa, "Speaker verification method using bone-conduction and air-conduction speech," Intelligent Signal Processing and Communication Systems, 2009. ISPACS 2009. International Symposium on, Kanazawa, 2009, pp. 449-452.*

(Continued)

*Primary Examiner* — Paras D Shah
(74) *Attorney, Agent, or Firm* — Jordan IP Law, LLC

(57) ABSTRACT

Systems and methods may provide for determining a sound vibration condition of an ambient environment of a wearable device and determining a motion condition of the wearable device. In addition, one or more automated voice operations may be performed based at least in part on the sound vibration condition and the motion condition. In one example, two or more signals corresponding to the sound vibration condition and the motion condition may be combined.

15 Claims, 4 Drawing Sheets

(56) References Cited

U.S. PATENT DOCUMENTS

| | | | |
|---|---|---|---|
| 2010/0121636 A1* | 5/2010 | Burke | G06F 3/0346 704/233 |
| 2012/0035924 A1 | 2/2012 | Jitkoff et al. | |
| 2013/0080167 A1* | 3/2013 | Mozer | G10L 17/22 704/246 |
| 2013/0090931 A1* | 4/2013 | Ghovanloo | G06F 3/011 704/275 |
| 2013/0119255 A1 | 5/2013 | Dickinson et al. | |
| 2014/0126782 A1* | 5/2014 | Takai | G06K 9/0061 382/116 |
| 2014/0244273 A1* | 8/2014 | Laroche | G06F 1/3206 704/275 |
| 2014/0249820 A1* | 9/2014 | Hsu | G06F 3/017 704/275 |
| 2014/0270231 A1* | 9/2014 | Dusan | G10L 25/90 381/74 |
| 2014/0278395 A1* | 9/2014 | Zurek | G10L 15/065 704/233 |
| 2014/0278435 A1* | 9/2014 | Ganong, III | G10L 15/22 704/275 |
| 2014/0330561 A1* | 11/2014 | Cho | G10L 15/22 704/235 |
| 2015/0065199 A1* | 3/2015 | Shah | H04W 52/0254 455/563 |
| 2015/0120293 A1* | 4/2015 | Wohlert | G10L 21/003 704/235 |
| 2015/0221307 A1* | 8/2015 | Shah | G06F 3/16 704/253 |

OTHER PUBLICATIONS

A. H. Sayed, "Adaptive Filters", Description and Table of Contents, John Wiley & Sons, NJ, 2008, 13 pages.

International Search Report and Written Opinion for PCT Application No. PCT/US2014/065621, mailed Feb. 10, 2015, 14 pages.

\* cited by examiner

US 9,620,116 B2

PERFORMING AUTOMATED VOICE OPERATIONS BASED ON SENSOR DATA REFLECTING SOUND VIBRATION CONDITIONS AND MOTION CONDITIONS

TECHNICAL FIELD

Embodiments generally relate to wearable devices. More particularly, embodiments relate to performing automated voice operations based on sensor data reflecting sound vibration conditions and motion conditions associated with wearable devices.

BACKGROUND

Wearable devices such as Bluetooth (e.g., Institute of Electrical and Electronics Engineers/IEEE 802.15.1-2005, Wireless Personal Area Networks) headsets may be used to capture voice input from the wearer of the device in order to place and/or conduct telephone calls, control media playback, and so forth. While conventional wearable devices may be suitable under certain circumstances, there remains considerable room for improvement. For example, the accuracy of voice controlled wearable devices may be limited with respect to the detection and/or evaluation of voice input, particularly in ambient environments having a relatively high level of audible noise. Moreover, low accuracy may lead to a poor user experience, higher power consumption and shorter battery life.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
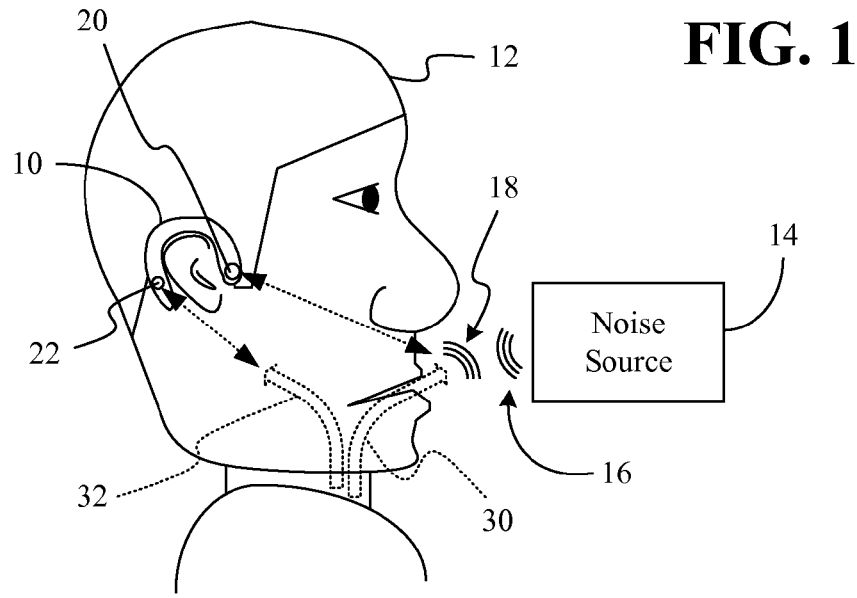
FIG. 1 is an illustration of an example of a wearable device in an ambient environment containing noise according to an embodiment.

Turning now to FIG. 1, a wearable device 10 is shown, wherein the device 10 is worn by a user 12 who is speaking More particularly, the vocal cords, voice box and/or larynx of the user 12 may move and/or vibrate in a manner that has a mouth and air related transfer function 30 resulting in audible sound waves and/or vibrations 18 in the air near the mouth of the user 12, wherein those sound vibrations 18 may be characterized as speech. In the illustrated example, the user 12 is speaking in an ambient environment containing a noise source 14 such as, for example, one or more other people, radios, televisions, machinery, etc. Thus, audible noise 16 from the source 14 may interfere/mix with the sound vibrations 18 while the user 12 is speaking. As a result, if an air-based (e.g., acoustic) microphone 20 of the wearable device 10 is configured to capture the sound vibrations 18 associated with the speech of the user 12, the audible noise 16 may degrade one or more audio signals generated by the air-based microphone 20.

The illustrated wearable device 10 also includes a contact-based component 22 to detect and/or determine additional conditions of the wearable device 10 to supplement the signals obtained from the air-based microphone 20. The contact-based component 22 may rely upon physical contact with the user 12 to detect and/or determine the additional conditions. In this regard, the jawbone, vocal cords, voice box and/or larynx of the user 12 may move and/or vibrate in a manner that has a head and bone conduction related transfer function 32 resulting in movement of the wearable device 10.

Thus, the contact-based component 22 may include, for example, an inertial sensor (e.g., gyroscope, accelerometer, etc.) and/or bone conduction microphone, that generates one or more signals to characterize the motion of the user's jawbone/face while speaking, physical vibrations of the user's vocal chords, voice box/larynx, etc., while speaking, and so forth. As will be discussed in greater detail, using the signals from the contact-based component 22 to supplement the signals obtained from the air-based microphone 20 may enable the wearable device 10 to achieve enhanced accuracy, a better user experience, lower power consumption and/or longer battery life relative to conventional wearable devices.

Figure 2:
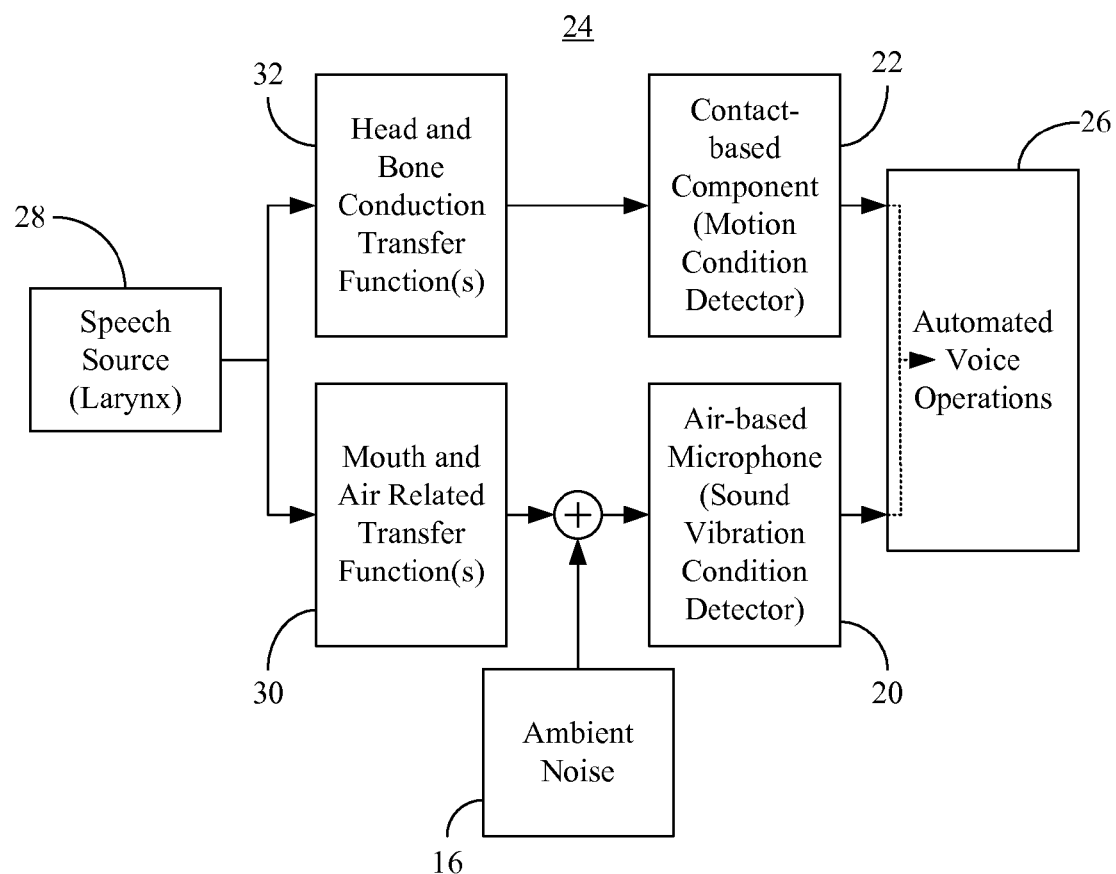
FIG. 2 is a block diagram of an example of a condition detection model for automated voice operations according to an embodiment.

FIG. 2 shows a condition detection model 24 for automated voice operations 26. In the illustrated example, a speech source 28 such as the larynx of a user may have one or more mouth and air related transfer functions 30 as well as one or more head and bone conduction transfer functions 32. The result of the mouth and air related transfer functions 30 may mix with ambient noise 16 to form a result that is captured by the air-based microphone 20 (e.g., sound vibration condition detector). In addition, the result of the head and bone conduction transfer functions 32 may be captured by the contact-based component 22 (e.g., motion condition detector). The signals from the microphone 20 and the contact-based component 22 may be used to control the automated voice operations 26. Of particular note is that the result of the head and bone conduction transfer functions 32 is not impacted by the ambient noise 16, in the illustrated example. The contact-based component 22 may therefore be a good complement to the air-based microphone 20, particularly in environments having relatively high levels of the ambient noise 16.

Although the dynamic range of the contact-based component 22 may be narrower than the dynamic range of the air-based microphone 20, the signals from the contact-based component 22 may still be useful in controlling the automated voice operations 26, particularly when used in combination with the signals from the air-based microphone 20. Indeed, in the case of an earpiece that is in direct contact of the user's ear, the signals from the contact-based component 22 may be highly reliable (e.g., much less spurious compared to a phone or other wearable devices).

Figure 3:
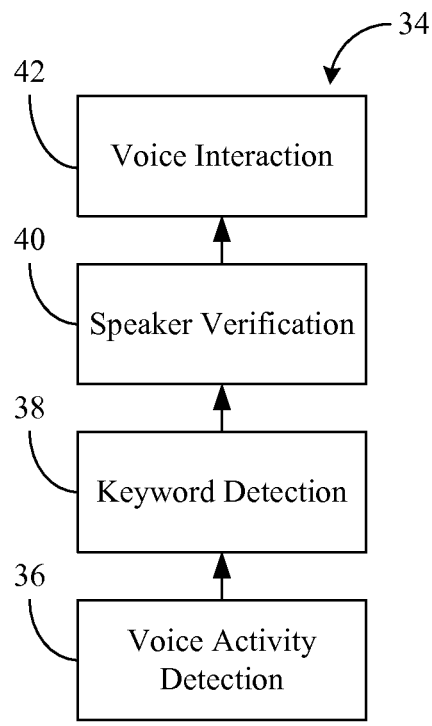
FIG. 3 is a block diagram of an example of an automated voice operation pipeline according to an embodiment.

Turning now to FIG. 3, a pipeline 34 of automated voice operations 26 is shown. In the illustrated example, a voice activity detection (VAD) stage 36 may determine whether an incoming audio signal contains voice content. Thus, the VAD stage 36 may be particularly useful if the wearable device is operated in an "always listening" mode in which the user may initiate voice interaction sessions purely with voice commands (e.g., hands-free). The VAD stage 36 may generally be used to reduce power consumption because further processing of the incoming audio signal may be avoided until a user actually speaks. The pipeline 34 may also include a keyword detection (1(D)) stage 38, which determines whether one or more key phrases (e.g., "Hello Jarvis") are contained in signals having voice content.

Additionally, a speaker verification (SV) stage 40 of the pipeline 34 may confirm whether an identified key phrase was spoken by a known/enrolled user (e.g., rather than a nearby individual, radio, television, etc.). The pipeline 34 may also include a voice interaction (VI) phase 42 that involves automated speech recognition (ASR) and personal assistant functionality. The personal assistant functionality might include, for example, searching for restaurants, answering questions, making reservations, etc., via a human-to-device interface (e.g., imitating a human-to-human interface). The voice interaction phase 42 may be conducted by a separate device (e.g., paired mobile phone, smart tablet, etc.), wherein the wearable device may sample the audio signal, pre-process the sampled audio signal and send it to the separate device.

In order to reduce the occurrence of false positives and/or false negatives at the various stages of the pipeline 34, a contact-based component such as the component 22 (FIG. 1), may be used to supplement a traditional air-based microphone such as the microphone 20 (FIG. 1). For example, if an inertial sensor is used as a contact-based component at the VAD stage 36, and the air-based microphone detects the presence of voice content in an incoming audio signal, the audio signal might be passed to the KD stage 38 only if the inertial sensor detects a sufficient level of motion (e.g., due to movement of the user's jaw). Similarly, if a bone conduction microphone is used as a contact-based component at the VAD stage 36, and the air-based microphone detects the presence of voice content in an incoming audio signal, the audio signal may be passed to the KD stage 38 only if the bone conduction microphone also detects activity (e.g., due to the presence of vibratory motion of the bone structure in the head of the user).

In addition, if a bone conduction microphone is used as a contact-based component at the KD stage 38, and the air-based microphone detects that one or more key phrases are contained in an audio signal having voice content, the SV stage 40 may be activated only if the bone conduction microphone also detects that one or more key phrases are contained in the audio signal (e.g., due to a particular vibratory motion signature being present in the bone structure in the head of the user). Moreover, if a bone conduction microphone is used as a contact-based component at the SV stage 40, and the air-based microphone detects that an identified key phrase was spoken by a known/enrolled user, the voice interaction stage 42 may be activated only if the bone conduction microphone also detects that the key phrase was spoken by the known/enrolled user (e.g., due to the particular vibratory motion signature being associated with the known/enrolled user). Simply put, source disambiguation may be achieved at the VAD stage 36, the KD stage 38 and/or the speaker verification stage 40 with a high level of accuracy.

In addition to using the benefits of source disambiguation, the word accuracy rates for the voice interaction stage 42 may be further increased through multi-modal audio fusion. For example, since the modalities of both the air-based microphone and the bone conduction microphone may observe the same underlying phenomena (i.e., the user speaking), signals from the air-based microphone sensor and the bone conduction microphone may be combined/fused to form a composite signal that may be more accurate than either signal by itself. Techniques such as, for example, traditional and/or adaptive filters may be used to estimate relative transfer functions such as the transfer functions 30, 32 (FIG. 2) and sensor uncertainties. The uncertainty characteristics of the two microphones may be used to derive optimal weights for the fusion.

Simply put, performing the automated voice operations based at least in part on the motion condition may increase accuracy and reduce power consumption in the wearable device. For example, each stage of the pipeline 34 may be triggered by the previous stage and executed in a progressively higher power domain (e.g., either in different hardware components consuming more power, or the same hardware running at a higher frequency). Thus, the VAD stage 36 may be a simple hardware chip using very low power, where the KD and SD stages 38, 40, respectively, may operate on a small, low power microcontroller. The voice interaction stage 42, on the other hand, may be implemented primarily on a paired phone that consumes much higher power than the wearable device.

Figure 4:
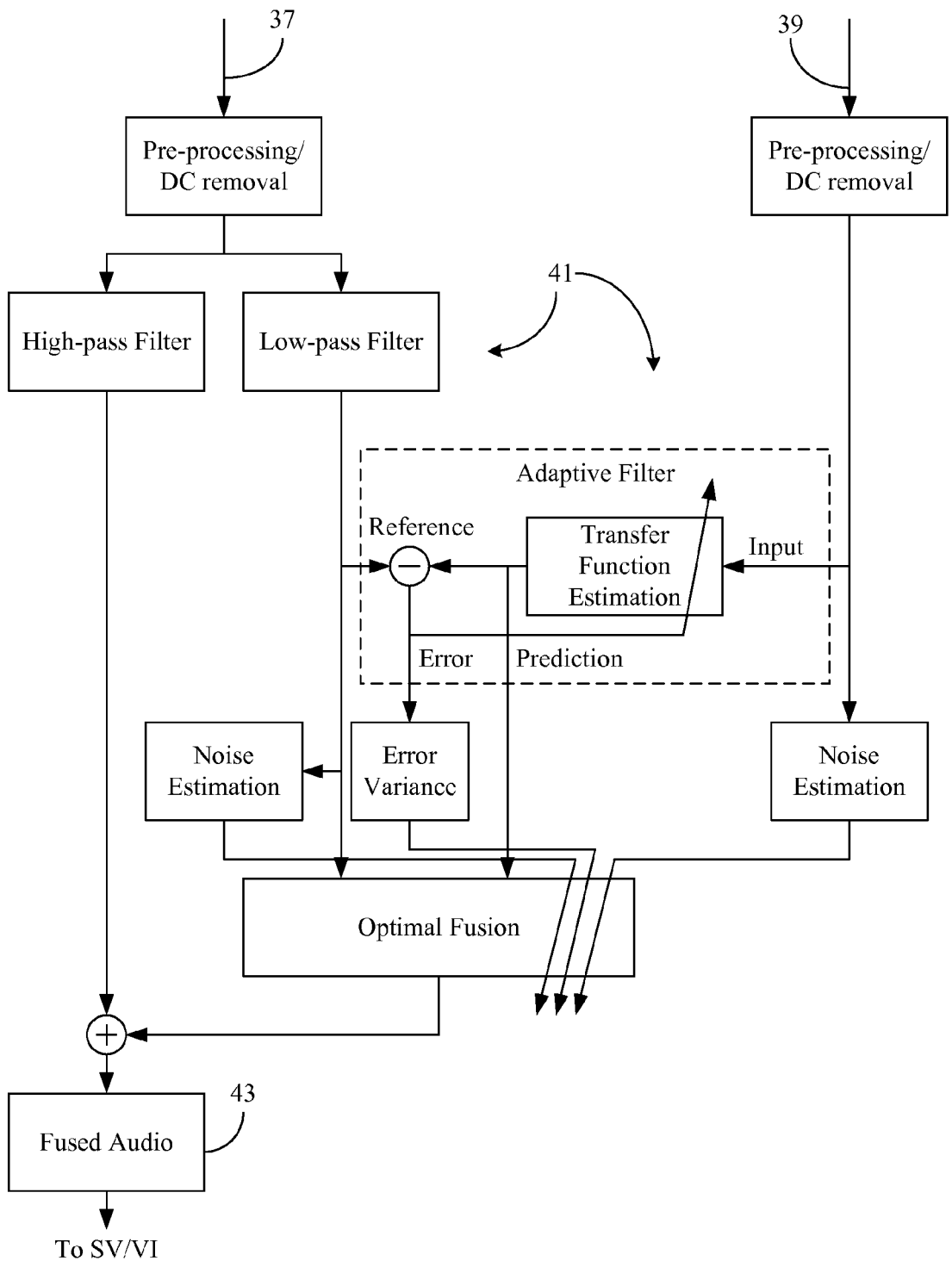
FIG. 4 is a block diagram of an example of a signal fusion solution according to an embodiment.

FIG. 4 shows a signal fusion module 35 that may be used to combine a first signal 37 from an air-based microphone with a second signal 39 from a contact-based component. In the illustrated example, various filters 41 (e.g., high-pass, low-pass, adaptive) are applied to the signals 37, 39. In addition, noise estimation and error variance techniques may be use to optimize the filtered results an obtain fused audio 43 that may be provided to speaker verification and/or voice interaction stages of an automated voice operation pipeline.

Figure 5:
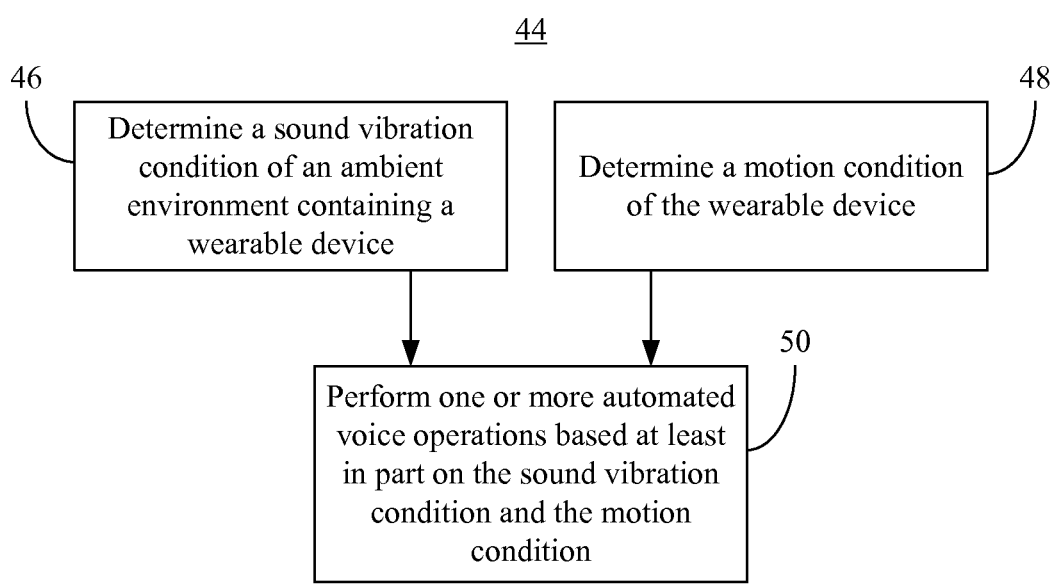
FIG. 5 is a flowchart of an example of a method of controlling automated voice operations according to an embodiment.

Turning now to FIG. 5, a method 44 of controlling automated voice operations is shown. The method 44 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 46 may determine a sound vibration condition of an ambient environment of a wearable device. As already noted, the sound vibration condition may be determined based on a signal associated with an air-based microphone of the wearable device. Additionally, a motion condition of the wearable device may be determined at block 48, wherein the motion condition may be determined based on a signal associated with an inertial sensor of the wearable device, a signal associated with a bone conduction microphone of the wearable device, and so forth.

Block 50 may perform one or more automated voice operations based at least in part on the sound vibration condition and the motion condition. In the case of an inertial sensor, at least one of the one or more automated voice operations may include a voice activity detection operation. In the case of a bone conduction microphone, at least one of the one or more automated voice operations might include a voice activity detection operation, a keyword detection operation, a speaker verification operation, a voice interaction operation, and so forth. Block 50 may also involve combining two or more signals corresponding to the sound vibration condition and the motion condition into a composite signal based on, for example, known transfer functions, sensor uncertainties, and so forth. Moreover, combining the signals may involve the use of one or more filters and/or relative weights.

Figure 6:
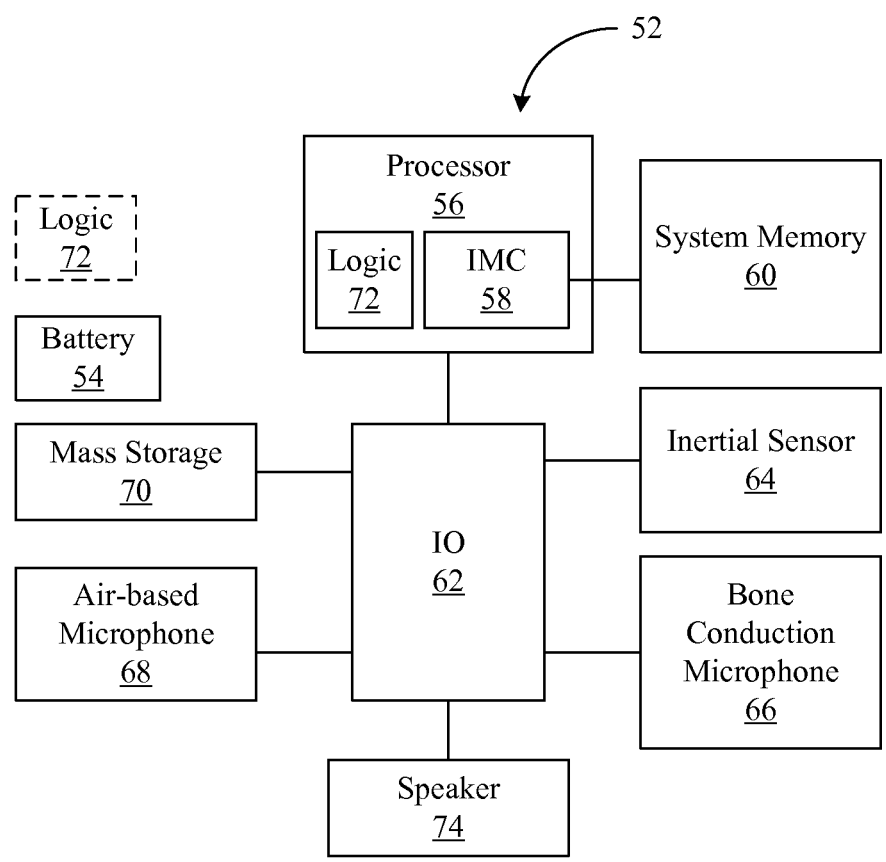
FIG. 6 is a block diagram of an example of a wearable device according to an embodiment.

FIG. 6 shows a wearable device 52. The wearable device 52 may include an earpiece (e.g., Bluetooth earpiece), headwear with a chinstrap (e.g., football helmet, hardhat, etc.), or other device coming into contact with the head, neck, ear and/or face of a user. In the illustrated example, the wearable device 52 includes a battery 54 to supply power to the wearable device 52 and a processor 56 having an integrated memory controller (IMC) 58, which may communicate with system memory 60. The system memory 60 may include, for example, dynamic random access memory (DRAM).

The illustrated wearable device 52 also includes a input output (IO) module 62 that functions as a host device and may communicate with, for example, an inertial sensor 64, a bone conduction microphone 66, an air-based microphone 68, a speaker 74 and mass storage 70 (e.g., flash memory, etc.). The processor 56 may execute an operating system (OS, not shown), one or more communication applications (e.g., near field communication/NFC, Bluetooth, etc., not shown), and so forth.

The illustrated processor 56 also executes logic 72 that is configured to determine a sound vibration condition of an ambient environment containing the wearable device 52 based at least in part on a signal associated with the air-based microphone 68, determine a motion condition of the wearable device based on a signal from the inertial sensor 64 and/or bone conduction microphone 66, and perform one or more automated voice operations based at least in part on the sound vibration condition and the motion condition. In one example, the logic 72 combines/fuses two or more signals corresponding to the sound vibration condition and the motion condition into a composite signal. Thus, the illustrated logic 72 may implement one or more aspects of the method 44 (FIG. 5), already discussed. Moreover, the wearable device 52 may be readily substituted for the wearable device 10 (FIG. 1).

The logic 72 may alternatively be implemented external to the processor 56. Additionally, the processor 56 and the IO module 62 may be implemented together on the same semiconductor die as a system on chip (SoC).

ADDITIONAL NOTES AND EXAMPLES

Example 1 may include a wearable device comprising an air-based microphone and logic, implemented at least partly in fixed-functionality hardware, to determine a sound vibration condition of an ambient environment of the wearable device based at least in part on a signal associated with the air-based microphone, determine a motion condition of the wearable device, and perform one or more automated voice operations based at least in part on the sound vibration condition and the motion condition.

Example 2 may include the wearable device of Example 1, wherein the logic is to use a combination of two or more signals corresponding to the sound vibration condition and the motion condition to perform the one or more automated voice operations.

Example 3 may include the wearable device of any one of Examples 1 or 2, further including an inertial sensor, wherein the motion condition is to be determined based at least in part on a signal associated with the inertial sensor.

Example 4 may include the wearable device of Example 3, wherein at least one of the one or more automated voice operations is to include a voice activity detection operation.

Example 5 may include the wearable device of any one of Examples 1 or 2, further including a bone conduction microphone, wherein the motion condition is to be determined based at least in part on a signal associated with the bone conduction microphone.

Example 6 may include the wearable device of Example 5, wherein at least one of the one or more automated voice operations is to include one or more of a voice activity detection operation, a keyword detection operation, a speaker verification operation or a voice interaction operation.

Example 7 may include a method of controlling automated voice operations, comprising determining a sound vibration condition of an ambient environment of a wearable device, determining a motion condition of the wearable device and performing one or more automated voice operation based at least in part on the sound vibration condition and the motion condition.

Example 8 may include the method of Example 7, further including using a combination of two or more signals corresponding to the sound vibration condition and the motion condition.

Example 9 may include the method of Example 7, wherein the sound vibration condition is determined based at least in part on a signal associated with an air-based microphone of the wearable device.

Example 10 may include the method of Example 7, wherein the motion condition is determined based at least in part on a signal associated with an inertial sensor of the wearable device and at least one of the one or more automated voice operations includes a voice activity detection operation.

Example 11 may include the method of any one of Examples 7 to 10, wherein the motion condition is determined based at least in part on a signal associated with a bone conduction microphone of the wearable device, wherein at least one of the one or more automated voice operations includes one or more of a voice activity detection operation, a keyword detection operation, a speaker verification operation or a voice interaction operation.

Example 12 may include at least one computer readable storage medium comprising a set of instructions which, if executed by a wearable device, cause the wearable device to determine a sound vibration condition of an ambient environment of the wearable device, determine a motion condition of the wearable device, and perform one or more automated voice operations based at least in part on the sound vibration condition and the motion condition.

Example 13 may include the at least one computer readable storage medium of Example 12, wherein the instructions, if executed, cause the wearable device to use a combination of two or more signals corresponding to the sound vibration condition and the motion condition.

Example 14 may include the at least one computer readable storage medium of Example 12, wherein the sound vibration condition is to be determined based at least in part on a signal associated with an air-based microphone of the wearable device.

Example 15 may include the at least one computer readable storage medium of any one of Examples 12 to 14, wherein the motion condition is to be determined based at least in part on a signal associated with an inertial sensor of the wearable device.

Example 16 may include the at least one computer readable storage medium of Example 15, wherein at least one of the one or more automated voice operations is to include a voice activity detection operation.

Example 17 may include the at least one computer readable storage medium of any one of Examples 12 to 14, wherein the motion condition is to be determined based at least in part on a signal associated with a bone conduction microphone of the wearable device.

Example 18 may include the at least one computer readable storage medium of Example 17, wherein at least one of the one or more automated voice operations is to include one or more of a voice activity detection operation, a keyword detection operation, a speaker verification operation or a voice interaction operation.

Example 19 may include an apparatus to manage automated voice operations, comprising logic, implemented at least partly in fixed-functionality hardware, to determine a sound vibration condition of an ambient environment of a wearable device, determine a motion condition of the wearable device, and perform one or more automated voice operations based at least in part on the sound vibration condition and the motion condition.

Example 20 may include the apparatus of Example 19, wherein the logic is to use a combination of two or more signals corresponding to the sound vibration condition and the motion condition to perform the one or more automated voice operations.

Example 21 may include the apparatus of Example 19, wherein the sound vibration condition is to be determined based at least in part on a signal associated with an air-based microphone of the wearable device.

Example 22 may include the apparatus of any one of Examples 19 to 21, wherein the motion condition is to be determined based at least in part on a signal associated with an inertial sensor of the wearable device.

Example 23 may include the apparatus of Example 22, wherein at least one of the one or more automated voice operations is to include a voice activity detection operation.

Example 24 may include the apparatus of any one of Examples 19 to 21, wherein the motion condition is to be determined based at least in part on a signal associated with a bone conduction microphone of the wearable device.

Example 25 may include the apparatus of Example 24, wherein at least one of the one or more automated voice operations is to include one or more of a voice activity detection operation, a keyword detection operation, a speaker verification operation or a voice interaction operation.

Example 26 may include an apparatus to manage voice operations, comprising means for performing the method of any one of Examples 7 to 11.

Thus, techniques described herein may significantly improve voice activity detection operations even in environments with high levels of ambient noise (e.g., in the presence of group conversations, public areas, etc.). In addition, false acceptance rates and false rejection rates may be reduced in keyword detection operations and speaker verification operations. Moreover, improved security may be achieved with respect to speaker verification. Additionally, the word accuracy rates of automated speech recognition operations may be improved, which may in turn lead to improved dialogues with virtual personal assistants. Techniques may also enhance the user experience and reduce power consumption due to a reduction in errors and user retries.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A wearable device comprising:
   an air-based microphone;
   a bone conduction microphone; and
   logic, implemented at least partly in fixed-functionality hardware, to:
   determine a sound vibration condition of an ambient environment of the wearable device based at least in part on a signal associated with the air-based microphone,
   determine a motion condition of the wearable device based at least in part on a signal associated with the bone conduction microphone, and
   perform one or more of a plurality of automated voice operations based at least in part on the sound vibration condition and the motion condition, wherein the plurality of automated voice operations are to be arranged in order of progressively higher power domains, wherein one of the plurality of automated voice operations is a speaker verification operation that is to be activated based on a detection of a key phrase by the air-based microphone and a specific vibratory motion signature associated with the key phrase by the bone conduction microphone, and wherein, when the speaker verification operation is activated, a subsequent voice operation from the plurality of automated voice operations is to be activated if the air-based microphone detects that an identified key phrase was spoken by a known speaker and the bone conduction microphone detects a vibratory motion signature associated with the known speaker.

2. The wearable device of claim 1, further including an inertial sensor, wherein the motion condition is to be determined based at least in part on a signal associated with the inertial sensor.

3. The wearable device of claim 2, wherein at least one of the one or more automated voice operations is to include a voice activity detection operation.

4. The wearable device of claim 1, wherein at least one of the one or more automated voice operations is to include one or more of a voice activity detection operation, a keyword detection operation, a speaker verification operation or a voice interaction operation.

5. A method comprising:
determining a sound vibration condition of an ambient environment of a wearable device based at least in part on a signal associated with an air-based microphone;
determining a motion condition of the wearable device based at least in part on a signal associated with a bone conduction microphone;
performing one or more of a plurality of automated voice operations based at least in part on the sound vibration condition and the motion condition, wherein the plurality of automated voice operations are arranged in order of progressively higher power domains;
activating a speaker verification operation from the plurality of automated voice operations based on a detection of a key phrase by the air-based microphone and a specific vibratory motion signature associated with the key phrase by the bone conduction microphone; and
activating a subsequent voice operation from the plurality of automated voice operations when the speaker verification operation is activated and when the speaker verification operation determines that the air-based microphone detects that an identified key phrase was spoken by a known speaker and the bone conduction microphone detects a vibratory motion signature associated with the known speaker.

6. The method of claim 5, wherein the motion condition is determined based at least in part on a signal associated with an inertial sensor of the wearable device and at least one of the one or more automated voice operations includes a voice activity detection operation.

7. The method of claim 5, wherein at least one of the one or more automated voice operations includes one or more of a voice activity detection operation, a keyword detection operation, a speaker verification operation or a voice interaction operation.

8. At least one non-transitory computer readable storage medium comprising a set of instructions which, if executed by a wearable device, cause the wearable device to:

determine a sound vibration condition of an ambient environment of the wearable device based at least in part on a signal associated with an air-based microphone;
determine a motion condition of the wearable device based at least in part on a signal associated with a bone conduction microphone;
perform one or more of a plurality of automated voice operations based at least in part on the sound vibration condition and the motion condition, wherein the plurality of automated voice operations are to be arranged in order of progressively higher power domains;
activate a speaker verification operation from the plurality of automated voice operations based on a detection of a key phrase by the air-based microphone and a specific vibratory motion signature associated with the key phrase by the bone conduction microphone; and
activate a subsequent voice operation from the plurality of automated voice operations when the speaker verification operation is activated and when the speaker verification operation determines that the air-based microphone detects that an identified key phrase was spoken by a known speaker and the bone conduction microphone detects a vibratory motion signature associated with the known speaker.

9. The at least one non-transitory computer readable storage medium of claim 8, wherein the motion condition is to be determined based at least in part on a signal associated with an inertial sensor of the wearable device.

10. The at least one non-transitory computer readable storage medium of claim 9, wherein at least one of the one or more automated voice operations is to include a voice activity detection operation.

11. The at least one non-transitory computer readable storage medium of claim 8, wherein at least one of the one or more automated voice operations is to include one or more of a voice activity detection operation, a keyword detection operation, a speaker verification operation or a voice interaction operation.

12. An apparatus comprising:
logic, implemented at least partly in fixed-functionality hardware, to:
determine a sound vibration condition of an ambient environment of a wearable device based at least in part on a signal associated with an air-based microphone,
determine a motion condition of the wearable device based at least in part on a signal associated with a bone conduction microphone, and
perform one or more of a plurality of automated voice operations based at least in part on the sound vibration condition and the motion condition, wherein the plurality of the automated voice operations are to be arranged in order of progressively higher power domains,
wherein one of the plurality of automated voice operations is a speaker verification operation that is to be activated based on a detection of a key phrase by the air-based microphone and a specific vibratory motion signature associated with the key phrase by the bone conduction microphone, and
wherein, when the speaker verification operation is activated, a subsequent voice operation from the plurality of automated voice operations is to be activated if the air-based microphone detects that an identified key phrase was spoken by a known speaker and the bone conduction microphone detects a vibratory motion signature associated with the known speaker.

13. The apparatus of claim 12, wherein the motion condition is to be determined based at least in part on a signal associated with an inertial sensor of the wearable device.

14. The apparatus of claim 13, wherein at least one of the one or more automated voice operations is to include a voice activity detection operation.

15. The apparatus of claim 12, wherein at least one of the one or more automated voice operations is to include one or more of a voice activity detection operation, a keyword detection operation, a speaker verification operation or a voice interaction operation.

* * * * *